Patented Nov. 11, 1947

2,430,591

UNITED STATES PATENT OFFICE 2,430,591

UREIDES OF GLYOXYLIC AND GLYCOLLIC ACIDS AS CATALYSTS FOR THE POLYMERIZATION OF BUTADIENE-1,3 HYDROCARBONS

William D. Stewart, Akron, Ohio, assignor to The B. F. Goodrich Company, New York, N. Y., a corporation of New York No Drawing. Application December 21, 1943, Serial No. 515,149

7 Claims. (Cl. 260—84.5)

This invention relates to the polymerization of unsaturated organic compounds which are capable of undergoing an addition polymerization to form high molecular weight linear polymers, and particularly to the polymerization in aqueous emulsion of conjugated butadienes either alone or in admixture with monomers copolymerizable therewith such as styrene and acrylonitrile to yield synthetic rubber. The principal object of the invention is to provide a method for decreasing the time required to effect such polymerization reactions.

I have discovered that the time required to effect addition polymerization reactions may be decreased by polymerizing unsaturated organic compounds in the presence of an organic compound containing at least one doubly bound carbon atom connected by its two remaining valences to two nitrogen atoms at least one of which is in turn connected to a carbon atom of an organic residue comprising another plural bond linking a pair of atoms one of which is a carbon atom, that is, a compound containing the characteristic structure

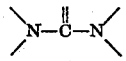

wherein the double bond on the carbon atom is connected to a single atom and at least one of the bonds on the nitrogen atoms is connected to a carbon atom of an organic radical containing an unsaturated linkage binding carbon.

In the compounds of this class the doubly bound carbon atom may be connected to any atom capable of linking to carbon by a double bond such as another carbon atom, an oxygen atom, a sulfur atom or a nitrogen atom, which atom if it possesses a valence of more than two may in turn be linked to other atoms or groups. Again, in the compounds of this class the nitrogen atoms may be connected either by single or double bonds to any possible atoms or groups, which may or may not form a ring structure with the characteristic

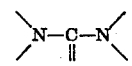

group, provided that at least one of the bonds on at least one of the nitrogens is connected to a carbon atom present in an organic residue or radical which contains, preferably no more than three atoms removed from the doubly bound carbon atom, an unsaturated linkage binding a pair of atoms one of which is carbon, examples of such unsaturated linkages being those present in the structures

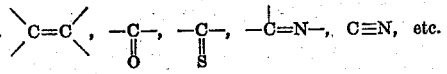

The remaining portions of the structures of the compounds of this class are relatively unimportant and may comprise hydrogen atoms or aliphatic, alicyclic, aromatic and heterocyclic organic residues or radicals whether or not containing other functional or substituent groups, but it is preferred that the compound contain, in addition to carbon and hydrogen, only elements of groups V and VI of the short periods of the periodic table, i. e., nitrogen, phosphorus, oxygen and sulfur.

One preferred subclass of compounds within this broad class consists of urea derivatives containing the characteristic urea structure

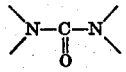

and having at least one of the bonds on the nitrogen atoms connected to a carbon atom of an organic residue containing an unsaturated linkage binding a carbon atom, and also having, preferably, all of the bonds on the nitrogens connected to hydrogen atoms or to carbon atoms of organic groups. Of this subclass, the particularly preferred compounds are the ureides (that is, derivatives of urea wherein at least one of the hydrogens is replaced by a radical containing a

group and which may be considered as derived by the reaction of urea or its hydrocarbon homologues with aldehydes or organic acids or their chlorides or anhydrides) such as acetyl urea, acetyl methyl urea, diacetyl urea, benzoyl urea and other ureides of monocarboxylic acid hydantoin (the cyclic ureide of glycollic acid), hydantoic acid (the open-chain ureide of glycollic acid), phenyl hydantoic acid, 3-methyl hydantoin, 5,5-dimethyl hydantoin, hydrouracil (the ureide of lactic acid) and similar ureides of hydroxy monocarboxylic acids; allanturic acid, allantoic acid and allantoin (ureides of glyoxylic acid), uracil (also known as 2,6-dioxypyrimidine), thymine (5-methyl uracil or 2,6-dioxy-5-methyl pyrimidine) and similar ureides of carbonyl-substituted (aldehyde and keto) aliphatic monocarboxylic acids; parabanic acid, aloxan and oxaluric acid (ureides of oxalic acid), barbituric acid (the ureide of malonic acid), 5,5-diethyl barbituric acid (veronal), dialuric acid, uramil, alloxanic acid and similar ureides of aliphatic dicarboxylic acids; and oxalantoin, alloxantin, uric acid (2,6,8-tri-oxypurine) and similar diureides. Other compounds in this subclass include biuret, cyanourea, alkylcyanoureas, carbonyldiurethan, carbonyl diurea, triacetone diurea, phenyl urea, vinyl urea, isocyanuric acid, isocyanuromonimide, isoammeline, and similar compounds of the character described. The 2-oxy-pyrimidines, which contain the structure

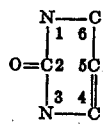

such as cytosine (2-oxy-6-amino pyrimidine) and the like, as well as uracil and thymine (mentioned above as examples of ureides), and the 2-oxypurines such as xanthine (2,6-dioxypurine) as well as uric acid (mentioned above as an example of a ureide) may also be considered as belonging to this subclass, as may the nucleic acids and neucleotides wherein the basic constituent (which is combined with a sugar and phosphoric acid) is cytosine, uracil or thymine.

Another subclass of compounds within the broad class described consists of compounds containing a purine ring. Purine possesses the ring structure

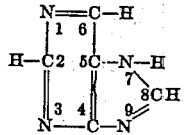

and it is seen that compounds possessing this ring structure fall within the broad class of compounds described since the ring contains a doubly bound carbon atom (in the 4-position) also connected to nitrogen atoms (3 and 9) which in turn are connected to carbon atoms in a structure comprising an unsaturated linkage binding carbon. Preferred purines for use in this invention are adenine (6-amino purine), guanine (2-amino-6-oxy purine) and hypoxanthine as well as xanthine and uric acid (mentioned hereinabove), although other purines such as caffeine and theobromine are also included. Nucleotides having adenin, hypoxanthine or guanine as one of their basic constituents such as yeast nucleic acid, thymonucleic acid, inosinic acid, guanylic acid and adenylic acid are also included in this subclass.

Still another preferred subclass of compounds within the broad class described consists of guanidine derivatives containing the characteristic guanidine structure

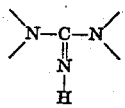

and having at least one of the two singly bound nitrogen atoms connected by a single valence to a carbon atom of an organic residue containing a plurally bound carbon atom, and having both the nitrogens connected by single valences to hydrogen atoms or carbon atoms of organic groups. One particularly preferred compound of this type is dicyandiamidine,

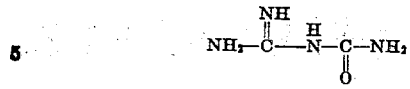

the use of which is more fully described and claimed in my copending application Serial No. 416,087 filed Oct. 22, 1941. This and other guanidine derivatives of the type described such as guanidinoacetic acid, glycolyl guanidine, creatine (methyl guanidinoacetic acid), creatine phosphate, creatinine

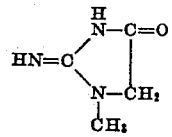

guanoline, biguanidine, dicyandiamide

guanyl thiourea, isocyanuromonimide (mentioned hereinabove), isomelamine, vinyl guanidine, phenyl guanidine and the like as well as other amidines, are also more fully described and claimed in my copending application Serial No. 515,150 filed December 21, 1943.

Still a fourth preferred subclass of compounds within the broad class consists of thiourea derivatives containing the characteristic structure

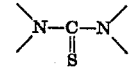

and having at least one of the bonds of the nitrogen atoms connected to a carbon atom of an organic residue containing an unsaturated linkage binding a carbon atom, and also having preferably all of the bonds on the nitrogens connected to hydrogen atoms or to carbon atoms of organic groups. Examples of compounds of this subclass include the thioureides (in which at least one of the bonds on the nitrogens is connected to a carbon atom of an organic group containing a

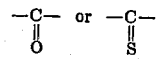

structure) such as thiohydantoin, phenylthiohydantoin, thioallantoin, thiobarbituric acid and similar thio derivatives of any of the ureides mentioned hereinabove, which are more fully described and claimed in the copending application of William D. Stewart and Benjamin M. G. Zwicker, Serial No. 444,596, filed May 26, 1942, as well as other compounds such as guanyl thiourea, trithiocyanuric acid allylthiocarbamide and the like.

Of all the above-mentioned compounds, it has been found that those which are water soluble are most effective as catalysts for the emulsion polymerizations of unsaturated organic compounds; hence with this preferred method of polymerizing the use of water-soluble catalysts is preferred. Specifically, it has been found that hydantoin, allantoin, alloxan, uracil, nucleic acids, guanine, adenine (whether as such or in the form of one of its water-soluble salts such as adenine sulfate) creatine, creatinine and other water-soluble compounds of the type described which are of importance in physiological processes, are the most effective catalysts, particularly for the emulsion polymerization of conjugated butadienes. Other very effective catalysts are dicyandiamidine (whether as such or in the form of a salt such as dicyandiamidine sulfate) and thiobarbituric acid.

In the practice of this invention addition polymerizations of unsaturated organic compounds to form high molecular weight linear polymers are preferably carried out in aqueous emulsion in the presence of the above-described catalysts although other methods of polymerization such as polymerization in homogeneous systems may also be employed. In the emulsion polymerization process, the unsaturated compounds, or monomers, to be polymerized are emulsified in water with the aid of an emulsifying agent; a catalyst of the type described above, together, if desired, with various other substances such as initiators and modifiers, of polymerization are included in the emulsion; and polymerization is then effected by agitating the emulsion until from 75 to 100% of the monomers are converted into polymers, the polymerization being terminated, if desired, by the addition to the emulsion of polymerization inhibitors such as hydroquinone or phenyl - beta-naphthylamine. The resulting polymerized emulsion containing polymer particles dispersed in water greatly resembles natural rubber latex and may be used as such or coagulated in the usual manner to yield the solid polymer.

Preferred methods of practicing the invention will be shown by the following specific examples which illustrate rather than limit the invention.

*Examples I, II, and III*

A mixture containing 5.5 parts by weight of butadiene-1,3, 4.5 parts of acrylonitrile, about 25 parts of a 2% solution of myristic acid which had been 85% neutralized with sodium hydroxide, 0.035 part of hydrogen peroxide and 0.06 part of diisopropyl dixanthogen is agitated at 40° C. The polymerization requires 20 hours to reach completion. The inclusion in the emulsion, however, of 0.025 part of hydantoin or dicyandiamidine sulfate reduces the time required for the polymerization to reach completion to 14 hours, and a like reduction in the time required is achieved by the use of only 0.015 part of creatine. The products prepared in the presence of the catalysts exhibit excellent milling properties and are 100% soluble in acetone although products prepared similarly in the absence of the catalysts are difficult to mill particularly at high temperatures, and are only about 50% soluble in acetone. The products also may be vulcanized to form strong resilient vulcanizates which resist oil and abrasion to a marked degree, and are capable of use not only as a replacement for natural rubber but also in applications where rubber cannot be employed because of its inherent defects.

*Example IV*

A mixture containing 12 parts by weight of butadiene-1,3, 4 parts of styrene, about 20 parts of a 3% aqueous solution of an alkyl benzene sulfonate, 0.23 part of $Na_2HPO_4.12H_2O$, 0.06 part of potassium persulfate, and 0.096 part of mixed higher aliphatic mercaptans with chains containing from 10 to 18 carbon atoms is agitated at 45° C. The polymerization requires 44 hours to reach completion, but when 0.05 part of adenine sulfate is added at the beginning of the polymerization, the reaction is finished in only 13 hours, and yields a concentrated synthetic latex well suited for use in dipping operations and the like.

*Example V*

The polymerization described in Example IV is repeated except that 0.05 part of creatinine is substituted for the adenine sulfate. In this case the polymerization is complete in only 14 hours and the product is a concentrated synthetic rubber latex which either may be used as latex in the production of dipped goods etc., or may be coagulated to yield a solid butadiene-1,3 styrene synthetic rubber of excellent working properties and high resilience and strength.

*Example VI*

The polymerization described in Example IV is again repeated, this time employing 0.05 part of allantoin as the catalyst in place of adenine sulfate. The polymerization is complete in 20 hours and a product of the type described in Examples IV and V is obtained. Similar reductions in polymerization time (from 44 hours to about 20 hours) for this polymerization recipe may be obtained by employing other ureides such as alloxan, uracil, hydantoin and oxaluric acid in place of the allantoin.

*Example VII*

A mixture containing 12 parts by weight of butadiene-1,3, 4 parts by weight of styrene, about 20 parts of a 4% aqueous solution of fatty acid soap, 0.23 part of $Na_2HPO_4.12H_2O$, 0.06 part of potassium persulfate and 0.072 part of diisopropyl dixanthogen is agitated at 50° C. The polymerization is only 5% complete in 13 hours, but when 0.025 part of thiobarbituric acid is added at the beginning of polymerization, the reaction is 50% complete in 13 hours.

The catalysts of this invention may also be employed in conjunction with water-soluble simple or complex heavy metal compounds, in which case the polymerization proceeds more rapidly than when either catalyst is employed alone and the system will tolerate considerably higher proportions of heavy metal. The use of water-soluble heavy metal compounds as catalysts is claimed in the copending applications of William D. Stewart Serial Nos. 379,713 to 379,717, filed February 14, 1941 and Serial No. 475,795 filed February 11, 1943. As therein disclosed, the term "heavy metal" is used to signify metals which have a density greater than four, an atomic weight greater than forty and a low atomic volume (ratio of atomic weight to density) and consequently appear substantially at the minimum points above an atomic weight of forty on Lothar Meyer's atomic volume curve. The metals appearing in the center positions of the long periods of a periodic table arranged in short and long periods, and especially those which occur in the 6th to 12th positions of the long periods (considering the alkali metals to occupy the first position and all the rare earth metals to occupy a single position), that is, the metals appearing in Group VIII of the Mendeleef Periodic Table such as iron, cobalt and nickel, subgroup B of Groups I and II of the Mendeleef Periodic Table such as zinc, cadmium and mercury, and subgroup A of Groups VI and VII of the Mendeleef Periodic Table such as chromium and manganese are accordingly among the metals included in the term "heavy metal." The metals occurring in the 6th to 12th positions of the first long period, particularly those in group VIII, specifically iron, cobalt, and nickel are preferred.

The practice of the invention employing catalysts comprising both a water-soluble heavy metal compound and a compound of the class described hereinabove is illustrated by the following examples.

Example VIII

An emulsion containing the following ingredients is prepared:

| | Parts |
|---|---|
| Butadiene-1,3 | 70 |
| Styrene | 30 |
| Sodium myristate (2% aqueous solution) | 250 |
| Hydrogen peroxide | 0.35 |
| Di-isopropyl dixanthogen | 0.45 |
| Ferrous ammonium sulfate | 0.05 |
| Yeast nucleic acid (a tetranucleotide containing guanine, cytosine, uracil and adenine radicals as the basic constituents) | 0.50 |

The emulsion is then agitated for 23 hours at 30° C. whereupon a synthetic latex is obtained which, when coagulated, produces a 98% yield of a rubbery butadiene-1,3 styrene copolymer. The copolymer is plastic and easily milled and may be compounded and vulcanized to yield strong elastic vulcanizates. When a similar emulsion is agitated without the addition of the iron salt and nucleic acid, over 150 hours are required for the polymerization and when the iron salt alone is used the polymerization is only 70% complete in 87 hours.

Example IX

The polymerization described in Example VIII is repeated except that 0.50 part of creatinine is employed in place of the nucleic acid. The polymerization requires 23 hours at 30° C. and a product similar to that described in Example VIII which is especially valuable for its excellent milling properties at high temperatures is obtained.

Examples X and XI

A mixture of 7 parts of butadiene-1,3, 3 parts of styrene, about 25 parts of a 2% solution of fatty acid soap, 0.025 part of hydrogen peroxide and 0.045 part of diisopropyl dixanthogen, is agitated at 40° C. in the presence of 0.0005 part of ferric alum and 0.025 part of dicyandiamidine sulfate. The polymerization is complete in 28 hours although in the absence of the dicyandiamidine sulfate 109 hours is required and in the absence also of the ferric alum over 150 hours is required. The use of two heavy metals further increases the polymerization rate; for example, when 0.005 part of ferric alum and 0.0005 part of cobaltous chloride are used with the dicyandiamidine sulfate the time for polymerization is decreased to 14 hours.

Example XII

When the polymerization of a mixture of the type described in the next preceding examples is repeated employing 0.00005 part of cupric sulfate and 0.25 part of dicyandiamidine sulfate as the catalysts, the polymerization is complete in 30 hours although a longer time is required when either the dicyandiamidine sulfate or the cupric salt is omitted from the recipe.

Example XIII

An emulsion of a mixture of 55 parts of butadiene-1,3 and 45 parts of acrylonitrile containing in addition 250 parts of a 2% aqueous solution of a fatty acid soap, 10 parts of a 3½% solution of hydrogen peroxide, 0.6 part of diisopropyl dixanthogen and a catalyst consisting of 0.03 part of ferric sulfate, 0.01 part of cobalt chloride and 0.25 part of hydantoin is agitated at 30° C. The polymerization requires only 10 hours to produce a 95% yield of a plastic, coherent, oil-resistant synthetic rubber possessing considerably more tack, higher solubility and better milling characteristics on a hot mill than is ordinarily found in butadiene-1,3 acrylonitrile copolymers.

Example XIV

The polymerization of Example XII is repeated employing, in place of hydantoin, 0.25 part of creatine. The polymerization requires only 8 hours to reach completion and a product similar to that of Example XII is obtained.

Example XV

A mixture containing 6.6 parts by weight of butadiene, 5.4 parts of acrylonitrile, about 25 parts of a 2% aqueous solution of myristic acid which had been 85% neutralized with sodium hydroxide, and an activator made by dissolving in water 0.002 part of $CoCl_2.6H_2O$ and 0.0002 part of $Fe_2(SO_4)_3.7H_2O$ is agitated at 30° C. The polymerization is 30% complete in 5 hours, but when 0.05 part of thiobarbituric acid is added at the beginning of the polymerization, the reaction is 80% complete in 5 hours. The use of 0.05 part of phenylthiohydantoic acid in the above recipe also similarly increases the rate of polymerization.

From the examples it is evident that the presence of the compounds of the class described remarkably increases the speed of the polymerization. It is also to be noted that in many cases the presence of the compounds also favorably affects the properties of the polymers as by increasing their solubility and plasticity, their tack and their ability to be milled at high temperatures. Hence, the compounds described are catalysts of polymerization and also in many cases may be said to be modifiers or co-modifiers (since they are preferably used with a sulfur-containing modifier) of polymerization because of their effect on polymer properties.

Although the preferred method of polymerization is by an emulsion polymerization as set forth in the specific examples, the compounds herein described may also be employed to accelerate the rate of polymerization in homogeneous systems in the presence or absence of solvents or diluents in the manners well known to the prior art.

The compounds of the class described when employed as catalysts according to this invention, may be employed in widely varying proportions. The use of from 0.1 to 0.5% by weight based on the polymerizable materials ordinarily gives a pronounced catalytic effect; hence such proportions are considered catalytic proportions. Greater amounts such as 1% or more can in general be employed if desired without any detrimental effects. When the catalyst also comprises a heavy metal compound, generally less than .1% of heavy metal compound, preferably in the form of a water-soluble salt, is employed, but the presence of compounds of the class described or other compounds which form complexes with heavy metal compounds permits the use of a greater concentration of heavy metal than can be employed in the absence of any complex-forming compound. If a complex-forming compound is employed, the complex-forming compound and the heavy metal compound may be added separately to the monomers prior to the polymerization, or may be reacted to form a heavy metal complex before they are added to the monomers.

The catalysts of this invention may be employed not only in the polymerization of conjugated butadienes, as in the preferred embodiment illustrated in the examples, but also in the polymerization of any unsaturated organic compounds which are capable of undergoing a truly addition polymerization to form a high molecular weight linear polymer, that is, a polymer having a molecular weight of at least about 10,000. Compounds which undergo such polymerizations are well known as a class to the art and in general are compounds containing a methylene ($CH_2$) group attached by an ethylenic double bond to a carbon atom. Compounds which undergo such polymerizations most readily as in aqueous emulsions also generally have the carbon atom attached to the methylene group in turn attached to an electronegative group such as a phenyl or vinyl group, a halogen atom, a group containing a

linkage or the like. Included in this class of monomers are the conjugated butadienes including the butadiene-1,3 hydrocarbons such as butadiene-1,3, isoprene, 2,3-dimethyl butadiene and piperylene, and also the substituted butadienes-1,3 such as chloroprene and 2-cyano butadiene-1,3; aryl olefins such as styrene, vinyl naphthalene, and alpha-chlorostyrene; acrylic and alpha-substituted acrylic acids, esters, nitriles, and amides such as acrylic acid, acrylonitrile, alpha-methacrylonitrile, alpha-chloracrylonitrile, methyl acrylate, methyl methacrylate, methacrylamide and the like; vinyl halides, esters, ethers, ketones and heterocyclic vinyl compounds, such as vinylidene chloride, vinyl chloride, vinyl acetate, methyl isopropenyl ketone, vinyl furane and methyl vinyl ether as well as other unsaturated hydrocarbons and their derivatives. Any of the above compounds may be polymerized alone to form simple polymers or in admixtures to form copolymers. Butadiene-1,3 and other such hydrocarbons, for instance, may be copolymerized in aqueous emulsion with one or more monomers of the above class which are copolymerizable therewith in aqueous emulsion such as acrylonitrile, styrene, methyl acrylate, methyl methacrylate, isobutylene or the like.

As emulsifying agents which may be employed in emulsion polymerizations as in the examples there may be mentioned soaps including fatty acid soaps such as sodium oleate, potassium palmitate, and sodium myristate and rosin and dehydrogenated rosin soaps; synthetic saponaceous materials including hymolal sulfates and alkaryl sulfonates such as sodium lauryl sulfate and sodium isopropyl naphthalene sulfonate; and salts of organic bases containing long carbon chains such as the hydrochloride of diethylaminoethyl-oleylamide, trimethylcetylammonium methyl sulfate, the hydrochloride of oleylamidoethyldimethylamine, and the hydrochloride of the diethylaminoethoxyanilide of oleic acid. The soaps are employed in polymerizations under basic conditions, the salts of organic bases under acid conditions, and the synthetic saponaceous materials under acid, alkaline, or neutral conditions.

The polymerization may be effected by various known initiators of polymerization, the use of which is illustrated in the examples, such as peroxy compounds including hydrogen peroxide, benzoyl peroxide, ammonium persulfate, potassium persulfate, and other peroxides and persalts such as persulfates, perborates, percarbonates, and the like, as well as other types of initiators such as diazoaminobenzene, sulfur dioxide, hyposulfites, bisulfites, dipotassium diazomethane disulfonate, and triphenylmethylazo-benzene. The polymerization, particularly if conducted homogeneously, may also be initiated by actinic radiation.

It is also desirable, particularly in the polymerization of conjugated butadienes to conduct the polymerization in the presence of a "modifier" of polymerization, that is, a compound which increases the plasticity and solubility of polymers prepared in their presence. Effective modifiers for homogeneous polymerizations include chlorinated compounds such as carbon tetrachloride, while preferred modifiers for emulsion polymerizations are sulfur-containing compounds such as the aliphatic mercaptans and dialkyl dixanthogens, the use of which is illustrated in the examples, and also the higher tetraalkyl mono- and polysulfides, mercaptoalkylthiazoles, etc.

Other methods and procedures known to be useful in connection with the polymerization of unsaturated organic compounds are within the spirit and scope of the invention as defined in the appended claims.

This application is a continuation-in-part of my copending application Serial No. 416,087, filed October 20, 1941.

I claim:

1. The method which comprises polymerizing in aqueous emulsion a mixture of butadiene-1,3 and acrylonitrile in the presence of a catalytic amount which is from 0.1 to 1.0% by weight based on the amount of material polymerized, of hydantoin.

2. The method which comprises polymerizing in aqueous emulsion a mixture of butadiene-1,3 and acrylonitrile in the presence of a catalytic amount of a water-soluble salt of a heavy metal occurring in group VIII and the first long period of the periodic table and in the presence of a catalytic amount which is from .01 to 1.0% by weight based on the amount of material polymerized, of hydantoin.

3. The method which comprises polymerizing in aqueous emulsion a mixture of butadiene-1,3 and styrene in the presence of a catalytic amount which is from .01 to 1.0% by weight based on the amount of material polymerized, of allantoin.

4. The method which comprises polymerizing in aqueous emulsion a mixture of butadiene-1,3 and styrene in the presence of a catalytic amount of a water-soluble salt of a heavy metal occurring in group VIII and the first long period of the periodic table and in the presence of a catalytic amount which is from 0.1 to 1.0% by weight based on the amount of material polymerized, of allantoin.

5. The method which comprises polymerizing in aqueous emulsion a butadiene-1,3 hydrocarbon in the presence of a catalytic amount which is from 0.1 to 1.0% by weight based on the amount of material polymerized, of allantoin.

6. The method which comprises polymerizing in aqueous emulsion a mixture of butadiene-1,3 hydrocarbon and a compound copolymerizable therewith in aqueous emulsion, in the presence of a catalytic amount which is from 0.1 to 1.0% by weight based on the amount of material polymerized, of a ureide made by condensing urea and glyoxylic acid.

7. The method which comprises polymerizing in aqueous emulsion a butadiene-1,3 hydrocarbon in the presence of a catalytic amount which is from 0.1 to 1.0% by weight based on the amount of material polymerized, of a ureide made by condensing urea with a two-carbon-atom carboxylic acid selected from the class consisting of glyoxylic acid and glycollic acid.

WILLIAM D. STEWART.

REFERENCES CITED

The following references are of record in the file of this patent:

UNITED STATES PATENTS

| Number | Name | Date |
|---|---|---|
| 1,935,733 | Tschunkin | Nov. 21, 1933 |
| 2,197,357 | Widmer | Apr. 16, 1940 |
| 2,234,076 | Gumlich | Mar. 5, 1941 |
| 2,265,722 | Nie | Dec. 9, 1941 |
| 2,317,181 | D'Alelio | Apr. 20, 1943 |
| 2,211,032 | Seidler | Aug. 13, 1940 |
| 2,354,210 | Jacobson | July 25, 1944 |
| 2,234,204 | Starkweather | Mar. 11, 1941 |
| 2,380,710 | Stewart | July 31, 1945 |

FOREIGN PATENTS

| Number | Country | Date |
|---|---|---|
| 318,115 | Great Britain | Aug. 26, 1929 |
| 255,129 | Germany | Dec. 20, 1912 |